United States Patent [19]

Hamid et al.

[11] Patent Number: 5,247,654

[45] Date of Patent: Sep. 21, 1993

[54] MINIMUM RESET TIME HOLD CIRCUIT FOR DELAYING THE COMPLETION OF A SECOND AND COMPLEMENTARY OPERATION

[75] Inventors: Mustafa A. Hamid; Roy E. Thoma, III, both of Houston, Tex.

[73] Assignee: Compaq Computer Corporation, Houston, Tex.

[21] Appl. No.: 354,444

[22] Filed: May 19, 1989

[51] Int. Cl.[5] .......................... G06F 3/00; G06F 13/00
[52] U.S. Cl. ..................................... 395/550; 395/275
[58] Field of Search ............... 364/285.1, 285.2, 280.3, 364/271.1, 271.5, 200, 900, 275, 550

[56] References Cited

U.S. PATENT DOCUMENTS

| | | | |
|---|---|---|---|
| 4,234,920 | 11/1980 | Van Ness et al. | 364/200 |
| 4,414,664 | 11/1983 | Greenwood | 364/200 |
| 4,484,263 | 11/1984 | Olson et al. | 364/200 |
| 4,485,435 | 11/1984 | Sibley | 364/200 |
| 4,600,990 | 7/1986 | Gershenson et al. | 364/200 |
| 4,689,766 | 8/1987 | Kent | 364/900 |
| 4,742,448 | 5/1988 | Sander et al. | 364/200 |
| 4,872,107 | 10/1989 | Marple et al. | 364/200 |
| 4,987,529 | 1/1991 | Craft et al. | 364/200 |
| 5,097,413 | 3/1992 | Mensch, Jr. | 395/775 |

FOREIGN PATENT DOCUMENTS

| | | |
|---|---|---|
| 0167879 | 1/1986 | European Pat. Off. . |
| 57-134731 | 8/1982 | Japan . |
| 58-52714 | 3/1983 | Japan . |
| 58-151628 | 9/1983 | Japan . |
| WO84/00088 | 1/1984 | PCT Int'l Appl. . |

OTHER PUBLICATIONS

IBM Technical Disclosure Bulletin, Method of Power On/Off Diskette Controller, vol. 29, No. 4, Sep. 1986, pp. 1723-1724.
IEEE, *Micro*, Floppy Disk Data Transfer Techniques, Dec. 1983, pp. 17-23.
Driver Schematic of Driver Adaptor, Multi I/O Card User's Manual, DOC:CB009-1.
Multi I/O Card V.2 User's Manual 19.

Primary Examiner—Eugene R. LaRoche
Assistant Examiner—Christopher R. Glembock
Attorney, Agent, or Firm—Pravel, Hewitt, Kimball & Krieger

[57] ABSTRACT

A circuit determines when a given operation has been performed and starts a counter. If a second operation, particularly an operation complementary to the first operation, is initiated before the counter reaches a predetermined value the second operation is held or delayed until the time is elapsed, after which time the second operation completes.

11 Claims, 2 Drawing Sheets

MINIMUM RESET TIME HOLD CIRCUIT FOR DELAYING THE COMPLETION OF A SECOND AND COMPLEMENTARY OPERATION

BACKGROUND OF THE INVENTION

1. Field of the Invention

The invention relates to computer systems, and more particularly, to a circuit for holding the processor should a request be made prior to an allowable time.

2. Discussion of the Related Art

Personal computers are getting steadily more powerful as microprocessor manufacturers develop ever faster and more powerful devices. Fast memory techniques, such as caching, are utilized to allow the microprocessors to operate at the maximum possible speed.

Some operations in the personal computer take a minimum fixed amount of time to occur and are not being changed as microprocessor speeds increase. For example, a standard floppy disk controller chip is used in personal computers compatible with the IBM PC/AT manufactured by International Business Machines Corporation (IBM). One manufacturer of the standard floppy disk controller is NEC Electronics, Inc., which designates its part the $\mu$PD765A (764). At time it is necessary to reset the floppy disk controller, either at system reset time or by software command. The 765 provides only a hardware reset input and does not itself provide a software reset command. To resolve this problem, a flip-flop which can be accessed by the processor is provided, the output of the flip-flop being connected to the reset input of the 765. The flip-flop is cleared by the system reset signal.

A problem arises because the reset signal to the 765 must be kept high for at least 3.5 microseconds according to product specifications. This time was not a problem in previous computer systems which used operating systems such as OS/2 by Microsoft Corporation and IBM. In OS/2, a portion of the software performs a software reset of the floppy disk controller. A zero value is written to the desired location, bit 2 of the byte located at either input/output (I/O) port 3F2 or 372 for IBM compatible systems. A short series of operations is performed and then a one value is written to the location to clear the reset and enable the floppy disk controller. In previous systems the time of execution of the various software operations between the and clearing setting of the location was sufficient to guarantee that the 765 was reset. However, as processor speeds increase, for example to 33 MHz for the 80386 system produced by Intel Corporation, the instruction sequence is performed in less than 3.5 microseconds, times of 1.6 to 2.0 microseconds having been measured for a 33 MHz 80386 having a cache memory and paged main memory. Thus the 765 cannot be reliably reset using standard software such as OS/2 operating in systems using high speed microprocessors.

SUMMARY OF THE INVENTION

The present invention determines when a zero value has been written to the floppy disk controller reset location and starts a counter. If the processor attempts to write a one to the floppy disk controller reset location before the desired time is elapsed, the processor is held until the desired time is elapsed, at which time the write cycle is completed. Thus the floppy disk controller is reliably reset at any processor speed and the software timing loop dependency is removed.

BRIEF DESCRIPTION OF THE FIGURES

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
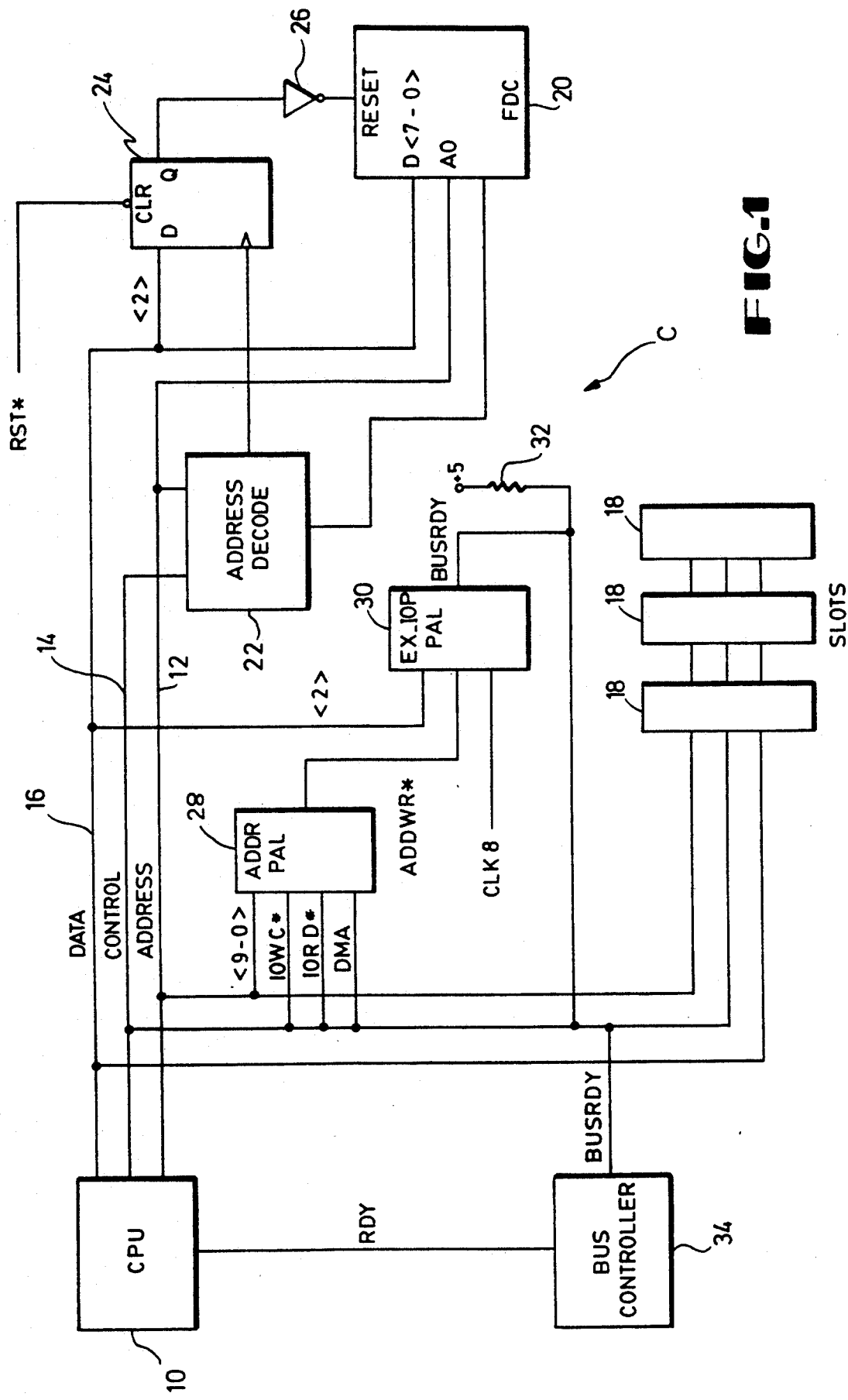
FIG. 1 is a block diagram of a computer system incorporating the present invention.

Referring now to FIG. 1, the letter C generally represents a computer system incorporating the present invention. The computer system C includes a processor 10 which has address 12, control 14, and data 16 busses. Over these three busses 12, 14 and 16, either directly or through various buffers, latches and controllers, the processor 10 provides the necessary address and control information to transfer data between various devices in the computer system C. Preferably the processor 10 is an 80386 produced by Intel Corporation. The address 12, control 14 and data 16 busses are coupled to a series of slots 18 which are provided for the incorporation of various interchangeable circuit boards (not shown) in the computer system C so that various additional features and capabilities can be provided as desired.

A floppy disk controller 20 is coupled to the address 12 and data 16 busses so that information can be transferred between the processor 10 and the floppy disk controller 20, which in turn is coupled to a floppy disk unit (not shown). Thus the processor 10 has means of accessing a mass storage device which is commonly used in personal computers. The enabling of the floppy disk controller 20 is provided by a signal produced by address decode circuitry 22. The address decode circuitry determines and analyzes the address 12 and control 14 busses to determine when a cycle is being addressed to the floppy disk controller 20. When the cycle is being addressed to floppy disk controller 20, a signal is provided by the address decode 22 to the floppy disk controller 20 to indicate that it is to be active. In an IBM compatible personal computer system the floppy disk controller 20 and associated circuitry are present at I/O ports of 3F0-3F7 or 370-377, these numbers being in a hexadecimal notation, as will be the remaining numbers specified for address or port values in this description. The 3F0 address block is the primary floppy disk controller address for an IBM compatible computer, while the 370 block is the secondary address. The floppy disk controller 20 is preferably a $\mu$PD765A produced by NEC Electronics, Inc. Other equivalent or compatible floppy disk controller devices can utilize the present invention.

As previously mentioned, software reset is desired and necessary under certain operating systems. The floppy disk controller 20 only has a hardware reset input so that an additional means must be provided to handle software reset cases. A flip-flop 24 is provided to perform this function. The flip-flop 24 has its D input connected to bit two of the data bus 16 and has its clear input connected to the RST* signal, which is the system reset signal. In general when referring to signals in this description, an asterisk (*) after a signal mnemonic indicates that it is logically true when a low voltage level is present and angle brackets with included numbers after a signal mnemonic are used to indicate single or multiple bit positions in a wider logical signal, such as the data or address fields. The flip-flop 24 is clocked by a signal produced by the address decode circuitry 22. This clocking signal has a rising edge at the end of a write operation being performed to I/O port 3F2 or 372, depending upon whether the primary or secondary location is being utilized for the floppy disk controller 20. The clock signal produced by the address decode circuitry preferably goes low at the beginning of an IOWC* signal according to the signals utilized in IBM compatible personal computers and goes high at the end of the IOWC* signal, thus having proper timing to clock the data present on the data bus 16 into the flip-flop 24 as the I/O write cycle completes.

The noninverting output of the flip-flop 24 is provided to the input of an inverter 26 whose output is in turn connected to the reset input of the floppy disk controller 20. Thus the processor 10 can write a data value having a bit 2 value of zero to I/O port 3F 2 or 372 and have this value latched by the flip-flop 24. This zero value is then inverted by the inverter 26, causing a reset operation of the floppy disk controller 20 to be initiated. After a given period of time a data value having a bit 2 position value of one can be written to I/O port 3F2 or 372 so that the flip-flop 24 receives the complementary value. This one value is then inverted by the inverter 26 so that a zero value is applied to the reset input of the floppy disk controller 20, thus terminating the reset operation.

If the interval between the writing of the zero and the writing of the one is sufficiently long, that is 3.5 microseconds for the preferred embodiment, then the floppy disk controller 20 has been properly reset and operations can commence. However, if this period was less than the necessary period prescribed for the particular floppy disk controller 20 being utilized, then the floppy disk controller 20 may not be properly reset so that data errors could occur. The condition of too short of an interval between the writing of the complementary values to the flip-flop 24 must be overcome so that the minimum necessary desired value is always developed.

To this end an address programmable array logic (PAL) device 28 is connected to the address bus 12 and receives bits 9-0 and is connected to the control bus 14 and receives IOWC*, IORD* and DMA signals. The IOWC* signal is a signal developed in computer systems utilizing the IBM compatible standard to indicate that an I/O port write operation is occurring, with the edges of the IOWC* signal appropriately timed in relation to the validity of the data on the data bus 16. The IORD* signal indicates that an I/O port read operation is occurring, this signal being utilized in combination with the IOWC* signal to ensure that only I/O write operations are utilized. The DMA signal is a signal which indicates that a DMA operation is occurring, so that the decoding is not developed during DMA operations, but only processor operations. The address PAL 28 provides an output signal designated as the ADDWR* signal, which goes low when I/O port addresses of 3F2 or 372 are properly being presented in a processor I/O write operation. The address PAL 28 equation utilized in providing the ADDWR* signal is as follows:

$$\begin{aligned}ADDWR = &(A\!<\!9\!>\cdot A\!<\!8\!>\cdot A\!<\!7\!>\cdot A\!<\!6\!>\cdot A\!<\!5\!>\cdot\\ &A\!<\!4\!>\cdot A\!<\!3\!>^*\cdot A\!<\!2\!>^*\cdot A\!<\!1\!>\cdot A\!<\!0\!>^*\cdot\\ &IOWC\cdot IORD^*\cdot DMA^*) + (A\!<\!9\!>\cdot A\!<\!8\!>\cdot\\ &A\!<\!7\!>^*\cdot A\!<\!6\!>\cdot A\!<\!5\!>\cdot A\!<\!4\!>\cdot A\!<\!3\!>^*\cdot\\ &A\!<\!2\!>^*\cdot A\!<\!1\!>\cdot A\!<\!0\!>^*\cdot IOWC\cdot\\ &IORD^*\cdot DMA^*)\end{aligned}$$

Thus, the address PAL 28 determines a when a write operation is being performed to the flip-flop 24.

The ADDWR* signal is one input to the EX_IOD PAL 30. There are two other inputs to the EX_IOD PAL 30 and those are bit 2 of the data bus 16 and a signal referred to as the CLK8 signal, which in the preferred embodiment is a clock signal having a frequency of approximately 8.33 MHz. The EX_IOD PAL 30 is configured to perform as a counter and has an output of the BUSRDY signal. The EX_IOD PAL 30 utilizes and feeds back various signals presented by the EX_IOD PAL 30 to develop a counter and to enable the driving of a low value onto the BUSRDY line. The BUSRDY line is preferably a line which is driven by tri-state or open collector devices and is pulled up to +5 volts by a resistor 32. The BUSRDY line is configured this way because any of the circuit boards located in the slots 18 can pull this line low to indicate that a device will not be ready and that wait states will be utilized. The BUSRDY signal is received by a bus controller 34 which then delays providing a RDY signal to the processor 10, which would indicate to the processor 10 that it can commence the next operation. Therefore, while the BUSRDY signal is low, the bus controller 34 holds the RDY signal so that the processor 10 is in a held or delayed condition. Because the BUSRDY signal is provided based on the value of a counter, this counter is set to a value such that the given desired time between the changing of the reset input of the floppy disk controller chip must elapse after the 0 value has been written to and prior to the 1 value being written to flip-flop 24. The equations utilized in the EX_IOD PAL 30 are as follows:

$$\begin{aligned}CNT0 :=\ & ((CNT4^*\cdot CNT3^*\cdot CNT2^*\cdot CNT1^*\cdot CNT0^*)^*\cdot\\ & (ADDWR\cdot SD2^*)^*\cdot CNT0^*) + (ADDWR\cdot SD2^*)\\ CNT1 :=\ & (CNT1^*\cdot CNT0\cdot (ADDWR\cdot SD2^*)^*) +\\ & (CNT1\cdot CNT0^*\cdot (ADDWR\cdot SD2^*)^*)\\ CNT2 :=\ & (CNT2^*\cdot CNT1\cdot CNT0\cdot (ADDWR\cdot SD2^*)^*) +\\ & (CNT2\cdot CNT1^*\cdot (ADDWR\cdot SD2^*)^*) +\\ & (CNT2\cdot CNT1\cdot CNT0^*\cdot (ADDWR\cdot SD2^*)^*)\\ CNT3 :=\ & (CNT3^*\cdot CNT2\cdot CNT1\cdot CNT0\cdot (ADDWR\cdot\\ & SD2^*)^*) + (CNT3\cdot CNT2^*\cdot (ADDWR\cdot SD2^*)^*) +\\ & (CNT3\cdot CNT2\cdot CNT1^*\cdot (ADDWR\cdot SD2^*)^*) +\\ & (CNT3\cdot CNT2\cdot CNT1\cdot CNT0^*\cdot (ADDWR\cdot SD2^*)^*)\\ CNT4 :=\ & (CNT4^*\cdot CNT3\cdot CNT2\cdot CNT1\cdot CNT0\cdot\\ & (ADDWR\cdot SD2^*)^*) +\\ & (CNT4\cdot CNT3^*\cdot (ADDWR\cdot SD2^*)^*) +\\ & (CNT4\cdot CNT3\cdot CNT2^*\cdot (ADDWR\cdot SD2^*)^*) +\\ & (CNT4\cdot CNT3\cdot CNT2\cdot CNT1^*\cdot (ADDWR\cdot SD2^*)^*) +\\ & (CNT4\cdot CNT3\cdot CNT2\cdot CNT1\cdot CNT0^*\cdot (ADDWR\cdot SD2^*)^*)\\ NONZ :=\ & (CNT4^*\cdot CNT3^*\cdot CNT2^*\cdot CNT1^*\cdot CNT0^*)^* +\\ & (CNT4\cdot CNT3\cdot CNT2)^*\end{aligned}$$

CLOCKED ON CLK8
BUSRDY = 0
Enable BUSRDY = NONZ · ADDWR · SD2

The CNT <4=0> signals represent a five bit counter which cycles from 00000 binary to 00000 binary again, counting up in steps of one. The CNT <4=1> values increase only when the flip-flop 24 is not addressed or when the bit 2 value being written is a one. The CNT <0> changes under two conditions, the first being when the counter value is not 00000 and the flip-flop 24 is not addressed or the bit 2 value is a one. This is the normal counting function, except that the counter stops at 00000. The second condition advances the counter from 00000 and is true when the flip-flop 24 is being addressed and the bit 2 value is zero. This second condition triggers the counter into operation, with the count advancing when the operation to the flip-flop 24 is completed. The NONZ signal is high or true from counts of 00001 to 11100 and low on counts of 00000 and 11101 to 11111, the interval from 00001 to 11101 being the desired 3.5 microseconds in the preferred embodiment. The NONZ signal is used in combination with the ADDWR* and SD2 signals to enable the tri-state buffer driving a zero or low value onto the BUSRDY line. The buffer is enabled while the NONZ signal is true, that is, the 3.5 microseconds has not elapsed, and the flip-flop 24 is having a one value written to it. The processor 10 is thus held until the 3.5 microseconds is completed, at which time the operation proceeds and the one value is clocked onto flip-flop 24.

Figure 2:
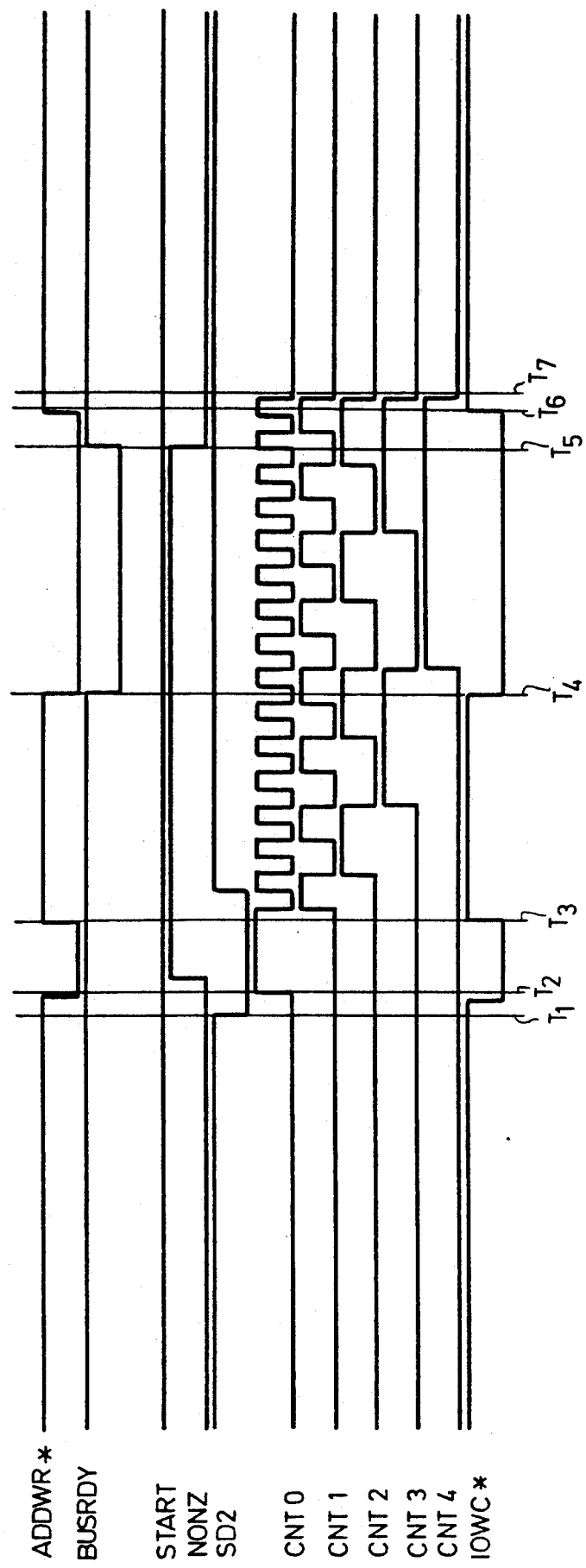
FIG. 2 is a timing diagram of portions of the computer system of FIG. 1.

The operation of the counter can readily be seen in the timing diagram of FIG. 2. At time T1, the processor 10 begins requesting a write operation to address 3F2 or 372, with a data bus 16 bit 2 value, referred to as the SD2 signal, having a 0 value. At time T2, the IOWC* and ADDWR* signals go low, indicating that the operation is being addressed to the flip-flop 24. Also at time T2, the counter advances from a 0 value as indicated by the CNT<4=0> values being 0 to a counter value of 1, as indicated by the CNT<0> signal having a 1 value. Shortly after time T2, the NONZ signal goes high, indicating that the counter no longer has a 0 value, thus indicating that a delay will be necessary should the processor 10 attempt to write a 1 value to the flip-flop 24 before the time interval has elapsed. At time T3, the I/O port write operation is completed and the processor proceeds to perform other operations. After this time, the counter proceeds to count up, based on the CLK8 signal, as shown. At time T4, the processor 10 now attempts to write a 1 value to the flip-flop 24, these conditions being indicated by the ADDWR* and IOWC* signals going low and the SD2 signal being high. Based on these conditions and the fact that the NONZ signal is high, the BUSRDY signal is driven low. The BUSRDY signal stays low until time T5, at which time the counter has counted past the value of 11100 and has progressed to the 11101 value. At this time the NONZ signal goes low, indicating that the required time delay interval is completed, with the BUSRDY signal thus going high because of the effects of the pullup resistor 32. Then, the bus controller 34 transmits the RDY signal to the processor 10 as necessary so that at time T6 the I/O port write operation is completed, as indicated by the IOWC* and ADDWR* signals going high. However, the counter continues to count until it reaches a 0 value at time T7. The counter reaches a true 0 value where it stops counting until a 0 value is written to the flip-flop 24.

Thus the counter provides an elapsed time period after the first or reset operation of the floppy disk controller 20 has been started. The counter and the associated logic of the EX_IOD PAL 30 combine so that the processor 10 is held or delayed until the necessary elapsed time has been completed, at which time the second, complementary operation of writing a 1 value to flip-flop 24 is completed which in turn terminates the reset operation to the floppy disk 20. While the circuit has been shown being utilized in the software reset of a floppy disk controller, it is understood that any address location or series of address locations and single or multiple bit values could be used and the present invention could be utilized.

The foregoing disclosure and description of the invention are illustrative and explanatory thereof, and various changes in the size, shape, materials, components, circuit elements, wiring connections and contacts, as well as in the details of the illustrative circuitry and construction may be made without departing from the spirit of the invention.

We claim:

1. A circuit to delay the completion of a second operation until a time period commenced by the occurrence of a prior first operation has elapsed wherein the first operation and the second operation are complementary, the circuit comprising:
    means for determining that the first operation has occurred;
    means coupled and responsive to said first operation occurring means for providing an elapsed time signal which is triggered upon the occurrence of the first operation;
    means for determining that the second operation is being initiated; and
    means coupled and responsive to said elapsed time signal and said means for determining that the second operation is being initiated for providing a delay signal to prevent the completion of the second operation until said elapsed time signal reaches a predetermined value.

2. The circuit of claim 1, wherein said means for providing an elapsed time signal includes a counter.

3. The circuit of claim 1, wherein the circuit is a computer circuit and the first operation and the second operation access a given address location.

4. The circuit of claim 3, wherein said first operation occurred means and said means for determining that the second operation is being initiated include means for determining if the given address location has been accessed.

5. The circuit of claim 1, wherein the first operation includes the writing of a particular value and the second operation includes the writing of a logically complementary value.

6. The circuit of claim 5, wherein the writing of said particular value initiates a reset operation and the writing of said logically complementary value terminates the reset operation.

7. A delay circuit for use in a computer system having a processor, an address bus, a data bus, control signals and an input/output device, the delay circuit comprising:
    means for determining that a first predetermined data value has been written by said processor to said input/output device;
    means coupled and responsive to said first data value determining means for providing an elapsed time signal which is triggered upon the writing of said predetermined data value;
    means for determining that a second predetermined data value is being written by said processor to said input/output device after said first data value has been written, wherein said second predetermined data value is the inverse of said first data value; and means coupled and responsive to said elapsed time signal and said means for determining that a second predetermined data value is being written for providing a delay signal to prevent said processor from completing the writing of said second data value until said elapsed time signal reaches a predetermined value since last being triggered.

8. The delay circuit of claim 7, wherein said first and second data values are written to the same address.

9. The delay circuit of claim 8, wherein the writing of said first data value initiates a reset operation of the input/output device and wherein the writing of said second data value terminates the reset operation.

10. The delay circuit of claim 7, wherein said delay signal indicates to the processor that the input/output device is not ready.

11. The delay circuit of claim 7, wherein the means for providing an elapsed time signal includes a counter.

* * * * *